US012614739B2

(12) United States Patent
Nimura et al.

(10) Patent No.: US 12,614,739 B2
(45) Date of Patent: Apr. 28, 2026

(54) MEMBER FOR FUEL CELL AND METHOD FOR MANUFACTURING SAME

(71) Applicant: Sumitomo Riko Company Limited, Aichi (JP)

(72) Inventors: Yasunori Nimura, Aichi (JP); Shota Taniguchi, Aichi (JP); Koji Morihara, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 662 days.

(21) Appl. No.: 18/178,546

(22) Filed: Mar. 6, 2023

(65) Prior Publication Data

US 2023/0207839 A1 Jun. 29, 2023

Related U.S. Application Data

(63) Continuation of application No. PCT/JP2021/016302, filed on Apr. 22, 2021.

(30) Foreign Application Priority Data

Sep. 30, 2020 (JP) ................................ 2020-165143

(51) Int. Cl.
*H01M 8/0284* (2016.01)
*H01M 8/10* (2016.01)

(52) U.S. Cl.
CPC .. *H01M 8/0284* (2013.01); *H01M 2008/1095* (2013.01)

(58) Field of Classification Search
None
See application file for complete search history.

(56) References Cited

U.S. PATENT DOCUMENTS

2018/0241056 A1* 8/2018 Soga .................. H01M 8/0271
2019/0002617 A1* 1/2019 Kotani .................... C09J 7/385

FOREIGN PATENT DOCUMENTS

| | | |
|---|---|---|
| CN | 107925098 | 4/2018 |
| EP | 3340352 | 5/2021 |
| JP | 2017188417 | 10/2017 |

OTHER PUBLICATIONS

"International Search Report (Form PCT/ISA/210) of PCT/JP2021/016302," mailed on Jul. 6, 2021, with English translation thereof, pp. 1-4.
"Office Action of China Counterpart Application", issued on Jan. 24, 2026, with English translation thereof, p. 1-p. 15.

* cited by examiner

*Primary Examiner* — Basia A Ridley
*Assistant Examiner* — Heng M. Chan
(74) *Attorney, Agent, or Firm* — JCIPRNET

(57) ABSTRACT

A member for a fuel cell in which a lip 4*b* is directly fixed to the surface of a separator 5. In the member for a fuel cell, the lip 4*b* is a cross-linked body of a radically curable composition containing components (A) to (E) below at a specific ratio, and the glass transition temperature (Tg) of the cross-linked body is −30° C. or less. (A) (Meth)acrylic polymer having a (meth)acryloyl group at a molecular chain end. (B) Monofunctional (meth)acrylic monomer having a glass transition temperature (Tg) of 0° C. or more and having a polycyclic structure. (C) Monofunctional (meth) acrylic monomer except for component (B). (D) Polyfunctional (meth)acrylic monomer. (E) Radical polymerization initiator.

9 Claims, 2 Drawing Sheets

MEMBER FOR FUEL CELL AND METHOD FOR MANUFACTURING SAME

CROSS REFERENCE TO RELATED APPLICATIONS

This application is a Continuation of PCT International Application No. PCT/JP2021/016302, filed on Apr. 22, 2021, which claims priority under 35 U.S.C § 119(a) to Patent Application No. 2020-165143, filed in Japan on Sep. 30, 2020, all of which are hereby expressly incorporated by reference into the present application.

TECHNICAL FIELD

The present disclosure relates to a member for a fuel cell which is used as a constituent member of a fuel cell, and a method for manufacturing the member for a fuel cell. More specifically, the present disclosure relates to a member for a fuel cell and a method for manufacturing the member for a fuel cell, the member for a fuel cell including: a base material for a fuel cell, and a seal member, in which the seal member is directly fixed (adhered without using an adhesive) to a surface of the base material for a fuel cell.

BACKGROUND ART

Various seal members are used for the members constituting a fuel cell. For example, in polymer electrolyte fuel cells for automobiles, a seal member that ensures sealability between a separator and the periphery of a membrane electrode assembly (MEA) and a porous layer is used in order to prevent leakage of gas and a refrigerant and keep the inside of the cell moist. In addition to various mechanical properties, the above-mentioned seal member is required to have excellent settling resistance (compression set) in order to ensure long-term reliability.

In response to such a demand, the applicant has proposed a seal member including a cross-linked body obtained by blending an organic peroxide and fatty acid potassium in ethylene-propylene-diene rubber (EPDM) (Patent Literature 1).

CITATION LIST

Patent Literature

[Patent Literature 1]
Japanese Patent Laid-Open No. 2017-188417

SUMMARY OF INVENTION

Technical Problem

However, because the seal member itself disclosed in Patent Literature 1 does not have pressure-sensitive adhesiveness, an adhesive is required to be applied to the contact portion with a separator and the like to adhere and fix the above-mentioned seal member. Furthermore, because it is difficult to form the above-mentioned seal member into a thin membrane, there is room for improvement in terms of miniaturization of fuel cells and the like by forming the seal member into a thin membrane.

Furthermore, because it is presumed that fuel cells will also be used in extremely low temperature environments with the spread of fuel cells in recent years, excellent sealability is required to be ensured by satisfying having properties such as settling resistance, stretchability, and compression resistance over a wide temperature range.

The present disclosure has been made in view of such circumstances, and the present disclosure provides a member for a fuel cell and a method for manufacturing the member for a fuel cell, the member for a fuel cell including: a base material for a fuel cell, and a seal member, in which the seal member can be firmly adhered to the surface of the base material for a fuel cell without using an adhesive, and furthermore, the seal member can be formed into a thin membrane and also have excellent sealability over a wide temperature range.

Solution to Problem

The inventors of the present conducted extensive research. In the course of the research, they found that it is possible to provide a member for a fuel cell in which by using a radically curable cross-linked body as the above-mentioned seal member, the above-mentioned seal member can be firmly and directly fixed (adhered without using an adhesive) to the surface of a base material for a fuel cell, and furthermore, the above-mentioned seal member can also be formed into a thin membrane and have excellent sealability by satisfying having properties such as settling resistance, stretchability, and compression resistance over a wide temperature range, provided that the radically curable cross-linked body has a glass transition temperature (Tg) of −30° C. or lower, and is formed of a composition obtained by incorporating, as a main component, a (meth)acrylic polymer (A) having a (meth)acryloyl group at a molecular chain end, and by blending, at a specific ratio thereinto, a monofunctional (meth)acrylic monomer (B) having a glass transition temperature (Tg) of 0° C. or higher and having a polycyclic structure, a monofunctional (meth)acrylic monomer (C) other than (B), a polyfunctional (meth)acrylic monomer (D), and a radical polymerization initiator (E).

The present disclosure includes the following [1] to [10] as the gist thereof.

[1] A member for a fuel cell including: a base material for a fuel cell; and a seal member that is directly fixed to a surface of the base material for a fuel cell, in which the seal member is a cross-linked body of a radically curable composition which contains the following component (D) at a proportion of 1 to 10 parts by weight and the following component (E) at a proportion of 0.01 to 10 parts by weight with respect to 100 parts by weight of the following component (A) and in which a content of the following component (B) with respect to a total weight of the following components (A) to (C) is 5% to 25% by weight, and a glass transition temperature (Tg) of the cross-linked body is −30° C. or lower.

(A) a (meth)acrylic polymer having a (meth)acryloyl group at a molecular chain end (B) a monofunctional (meth)acrylic monomer having a glass transition temperature (Tg) of 0° C. or higher and having a polycyclic structure (C) a monofunctional (meth)acrylic monomer excluding the component (B)

(D) a polyfunctional (meth)acrylic monomer (E) a radical polymerization initiator

[2] The member for a fuel cell according to [1], in which the polycyclic structure of the component (B) includes a polycyclic structure having 10 or more carbon atoms.

[3] The member for a fuel cell according to [1] or [2], in which a content of the component (C) in the radically curable composition is in a range of 0 to 75 parts by weight with respect to 100 parts by weight of the component (A).

[4] The member for a fuel cell according to any one of [1] to [3], in which the component (D) is at least one selected from the group consisting of 1,6-hexanediol di(meth)acrylate, 1,9-nonanediol di(meth)acrylate, and pentaerythritol acrylate compounds.

[5] The member for a fuel cell according to any one of [1] to [4], in which the radically curable composition further contains silica.

[6] The member for a fuel cell according to [5], in which the silica is at least one selected from the group consisting of silica dimethyl silylate, silica trimethyl silylate, silica octyl silylate, and silica methacryl silylate.

[7] The member for a fuel cell according to any one of [1] to [6], in which the radically curable composition is an ultraviolet curable composition.

[8] The member for a fuel cell according to any one of [1] to [7], in which the seal member is a membrane-like seal member.

[9] The member for a fuel cell according to [8], in which a thickness of the membrane-like seal member is 50 to 1,000 μm.

[10] A method for manufacturing a member for a fuel cell which is the member for a fuel cell according to any one of [1] to [9], the method including: a step of applying a radically curable composition to a surface of a base material for a fuel cell, provided that the radically curable composition contains the following component (D) at a proportion of 1 to 10 parts by weight and the following component (E) at a proportion of 0.01 to 10 parts by weight with respect to 100 parts by weight of the following component (A), and that in the radically curable composition, a content of the following component (B) with respect to a total weight of the following components (A) to (C) is 5% to 25% by weight; and a step of cross-linking the radically curable composition by irradiating a portion subjected to the application with active energy rays to form a seal member.

(A) a (meth)acrylic polymer having a (meth)acryloyl group at a molecular chain end (B) a monofunctional (meth)acrylic monomer having a glass transition temperature (Tg) of 0° C. or higher and having a polycyclic structure (C) a monofunctional (meth)acrylic monomer excluding the component (B)

(D) a polyfunctional (meth)acrylic monomer (E) a radical polymerization initiator

Advantageous Effects of Invention

According to the present disclosure, a member for a fuel cell can be provided, in which in the member for a fuel cell, the above-mentioned seal member can be firmly and directly fixed (adhered without using an adhesive) to the surface of a base material for a fuel cell, and the above-mentioned seal member can be formed into a thin membrane and have excellent sealability over a wide temperature range.

DESCRIPTION OF EMBODIMENTS

Figure 1:
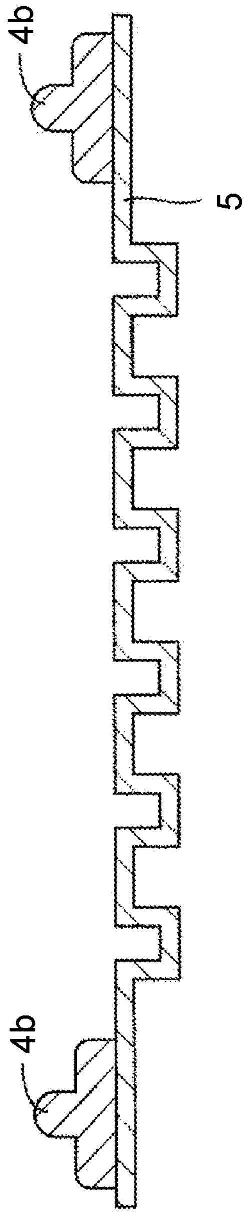
FIG. 1 is a cross-sectional view showing an example of a member for a fuel cell of the present disclosure.

Hereinafter, embodiments of the present disclosure will be described in detail. However, the present disclosure is not limited to these embodiments. In the present specification, "(meth)acrylic" is a term used as a concept encompassing both acrylic and methacrylic, "(meth)acrylate" is a term used as a concept encompassing both acrylate and methacrylate, and "(meth)acryloyl group" is a term used as a concept encompassing both acryloyl groups and methacryloyl groups. In addition, "polymer" is a term used as a concept encompassing copolymers and oligomers.

A member for a fuel cell of the present disclosure includes: a base material for a fuel cell; and a seal member, in which the seal member is directly fixed to a surface of the base material for a fuel cell, the seal member is a cross-linked body of a radically curable composition which contains the following component (D) at a proportion of 1 to 10 parts by weight and the following component (E) at a proportion of 0.01 to 10 parts by weight with respect to 100 parts by weight of the following component (A) and in which a content of the following component (B) with respect to a total weight of the following components (A) to (C) is 5% to 25% by weight, and a glass transition temperature (Tg) of the cross-linked body is −30° C. or lower.

(A) a (meth)acrylic polymer having a (meth)acryloyl group at a molecular chain end (B) a monofunctional (meth)acrylic monomer having a glass transition temperature (Tg) of 0° C. or higher and having a polycyclic structure (C) a monofunctional (meth)acrylic monomer excluding the component (B)

(D) a polyfunctional (meth)acrylic monomer (E) a radical polymerization initiator Each of the components which are the materials of the seal member will be described below.

<Component (A)>

The component (A) is a (meth)acrylic polymer having a (meth)acryloyl group at a molecular chain end. It is the main component of the radically curable composition, which is the material of the seal member, and usually accounts for 45% by weight or more of the entire composition and preferably accounts for 50% by weight or more of the entire composition. In addition, a polymer used in the above-mentioned composition is preferably composed of only the above-mentioned component (A) from the viewpoint of the function effect of the present disclosure.

The molecular chain (main chain) of the component (A) is constituted of a homopolymer or copolymer of one or more (meth)acrylic monomers, or a copolymer of one or more (meth)acrylic monomers and a vinyl-based monomer copolymerizable therewith.

Examples of the above-mentioned (meth)acrylic monomers include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, isoamyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, stearyl (meth)acrylate, isostearyl (meth)acrylate, oleyl (meth)acrylate, behenyl (meth)acrylate, 2-decyltetradecanyl (meth)acrylate, phenyl (meth)acrylate, toluyl (meth)acrylate, tolyl (meth)acrylate, 4-t-butylcyclohexyl (meth)acrylate, dicyclopentenyl (meth)acrylate, dicyclopentenyloxyethyl (meth)acrylate, dicyclopentanyl (meth)acrylate, dicyclopentanyloxyethyl (meth)acrylate, and isobornyl (meth)acrylate. These may be used alone, or a plurality of them may be copolymerized.

In addition, the above-mentioned (meth)acrylic monomer may be copolymerized with other monomers, or may be block-copolymerized. Examples of monomers for copolymerization include styrene-based monomers such as styrene, fluorine-containing vinyl monomers such as perfluoroethylene, silicon-containing vinyl-based monomers such as vinyltrimethoxysilane, nitrile group-containing vinyl-based monomers such as acrylonitrile and methacrylonitrile, and amide group-containing vinyl-based monomers such as acrylamide and methacrylamide.

Among the above examples, (meth)acrylic acid ester monomers such as ethyl (meth)acrylate, n-butyl (meth) acrylate, 2-ethylhexyl (meth)acrylate, and stearyl (meth) acrylate are preferable, and an acrylic acid ester monomer having an ester group having 2 to 14 carbon atoms, and a methacrylic acid ester monomer having an ester group having 8 to 14 carbon atoms are more preferable. When the number of carbon atoms in the ester group is outside the above-mentioned range, the compression set and the like at low temperatures tend to deteriorate. Furthermore, particularly when the number of carbon atoms exceeds the above-mentioned range, the reactivity at the time of polymerization tends to deteriorate, making synthesis difficult.

The component (A) is preferably a copolymer of (meth) acrylic acid ester monomers having a (meth)acryloyl group at the molecular chain end, and is more preferably a copolymer obtained by radical polymerization of a (meth)acrylic acid ester monomer such as ethyl (meth)acrylate, n-butyl (meth)acrylate, 2-ethylhexyl (meth)acrylate, and stearyl (meth)acrylate. Among them, a copolymer obtained by polymerizing n-butyl (meth)acrylate and 2-ethylhexyl (meth)acrylate is particularly preferable.

The copolymerization ratio (weight ratio) of the above-mentioned copolymer of (meth)acrylic acid ester monomers is preferably 40:60 to 60:40 in the case of a copolymer obtained by polymerizing n-butyl acrylate and 2-ethylhexyl acrylate (n-butyl acrylate:2-ethylhexyl acrylate), for example, from the viewpoint of more effectively exhibiting the effect of the present disclosure.

The component (A) is a (meth)acrylic polymer having a (meth)acryloyl group at at least one molecular chain end, but is preferably a (meth)acrylic polymer having (meth)acryloyl groups at both ends of the molecular chain from the viewpoint of more effectively exhibiting the effect of the present disclosure.

The component (A) is preferably a compound represented by General Formula (1) from the viewpoint of more effectively exhibiting the effect of the present disclosure.

(1)

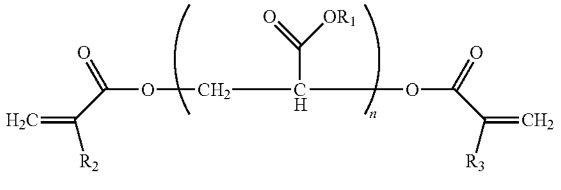

(Provided that in General Formula (1), $R_1$ is a hydrogen atom or an ester residue having 1 to 20 carbon atoms, $R_2$ and $R_3$ are each a hydrogen atom or an organic group having 1 to 20 carbon atoms, and n is an integer of 20 to 800.)

In General Formula (1) above, the ester residue having 1 to 20 carbon atoms may be linear, branched, or cyclic, and examples thereof include a methyl ester residue, an ethyl ester residue, an n-propyl ester residue, an isopropyl ester residue, an n-butyl ester residue, an isobutyl ester residue, a t-butyl ester residue, a pentyl ester residue, a hexyl ester residue, a heptyl ester residue, an octyl ester residue, a cyclopentyl ester residue, and a cyclohexyl ester residue. Among them, an ester residue having 2 to 14 carbon atoms is preferable as the above-mentioned ester residue. Furthermore, in General Formula (1), examples of the organic group include unsubstituted or substituted monovalent hydrocarbon groups having 1 to 20 carbon atoms such as an alkyl group having 1 to 20 carbon atoms, an alkenyl group having 2 to 20 carbon atoms, an aryl group having 6 to 20 carbon atoms, and an aralkyl group having 7 to 20 carbon atoms. From the viewpoint of enhancing reactivity, the above-mentioned organic group is preferably a hydrogen atom or an alkyl group, among which a hydrogen atom or a methyl group is more preferable. In General Formula (1), n is an integer of 20 to 800, among which an integer of 50 to 400 is preferable.

For these components (A), one type may be used alone, and two or more types may be used in combination.

The glass transition temperature (Tg) of the component (A) is not particularly limited, but is preferably −40° C. or lower and more preferably −50° C. or lower, for example. When the glass transition temperature (Tg) of the component (A) is higher than the above-mentioned temperature, the compression set and the like at low temperatures tend to deteriorate. Although the lower limit value is not particularly limited, it is −100° C., for example.

Such a glass transition temperature (Tg) of the component (A) is measured with a differential scanning calorimeter (DSC). Specifically, using a differential scanning calorimeter (DSC) SSC-5200 manufactured by Seiko Instruments Inc., after performing preliminary adjustment to once raise the temperature of a sample to 200° C. at a rate of 25° C./min, maintain the temperature for 10 minutes thereafter, and lower the temperature to 50° C. at a rate of 25° C./min, measurement is performed while raising the temperature to 200° C. at a rate of 10° C./min to obtain an integrated value from the obtained DSC curve, and thereby the glass transition temperature is obtained from the maximum point thereof.

The glass transition temperature (Tg) of each component used in the present disclosure and the glass transition temperature (Tg) of each component used in examples and comparative examples to be described later are also obtained as described above.

The number average molecular weight (Mn) of the component (A) is 5,000 to 100,000, and is preferably 10,000 to 50,000, for example. When the number average molecular weight (Mn) is smaller than the above-mentioned range, a compression cracking property tends to deteriorate, whereas when the number average molecular weight is larger than the above-mentioned range, the compression set tends to deteriorate, and also handleability tends to deteriorate due to a high viscosity exhibited.

The molecular weight distribution (weight-average molecular weight (Mw)/number average molecular weight (Mn)) of the component (A) is preferably 1.1 to 1.6 and more preferably 1.1 to 1.4 from the viewpoint of more effectively exhibiting the effect of the present disclosure. The number average molecular weight (Mn) and the weight-average molecular weight (Mw) are measured by gel permeation chromatography (GPC). Specifically, using chloroform as a mobile phase, the measurement can be performed using a polystyrene gel column to obtain the number average molecular weight and the like in terms of polystyrene.

The viscosity of the component (A) at 23° C. is preferably 40 to 1,000 Pa·s and more preferably 100 to 800 Pa·s from the viewpoint of more effectively exhibiting the effect of the present disclosure.

As a method for synthesizing the component (A), known synthesis methods can be used, and for example, synthesis can be performed by radically polymerizing a (meth)acrylic acid monomer. Among them, living radical polymerization and atom transfer radical polymerization are preferable.

Furthermore, the component (A) is also available as a commercially available product, and examples thereof include RC-100C and RC-200C (both manufactured by KANEKA CORPORATION).

<Component (B)>

The monofunctional (meth)acrylic monomer that is the component (B) is a monofunctional (meth)acrylic monomer ((meth)acrylate compound having one (meth)acryloyl group in the molecular structure) having a glass transition temperature (Tg) of 0° C. or higher and having a polycyclic structure. In addition, the polycyclic structure in the above-mentioned component (B) is preferably a polycyclic structure having 10 or more carbon atoms, more preferably a polycyclic structure having 10 to 16 carbon atoms, and further preferably a polycyclic structure having 10 to 14 carbon atoms from the viewpoint of further enhancing the effect of the present disclosure. In addition, the polycyclic structure is preferably a bicyclic structure or a tricyclic structure.

The glass transition temperature (Tg) of the component (B) is preferably 0° C. to 150° C. and more preferably 10° C. to 130° C. For such a glass transition temperature (Tg) of the component (B), a homopolymer of the monofunctional (meth)acrylic monomer, which is the component (B), is measured with a differential scanning calorimeter (DSC) in the same manner as described above.

In addition, specific examples of the component (B) include isobornyl (meth)acrylate, dicyclopentenyloxyethyl (meth)acrylate, dicyclopentanyl acrylate, and dicyclopentenyl acrylate. These may be used alone or in combination of two or more types thereof. Among them, isobornyl (meth) acrylate and dicyclopentenyloxyethyl (meth)acrylate are more preferable.

With respect to the total weight (100% by weight) of the components (A) to (C), the content of the component (B) is 5% to 25% by weight, and is preferably 6% to 24% by weight and more preferably 7% to 23% by weight from the viewpoint of further enhancing the effect of the present disclosure. That is, when the content of the component (B) is smaller than the above-mentioned range, desired pressure-sensitive adhesiveness (adhesiveness) and the like cannot be obtained, whereas when the content of the component (B) is larger than the above-mentioned range, properties such as compression set deteriorate.

<Component (C)>

The monofunctional (meth)acrylic monomer that is the component (C) is a (meth)acrylate compound excluding the component (B) and having one (meth)acryloyl group in the molecular structure. Specifically, there are known ethylenically unsaturated monofunctional monomers, and examples thereof include (meth)acrylic monomers used as monomers constituting the main chain of (A) above. Among them, from the viewpoint of further enhancing the effect of the present disclosure, acrylic acid alkyl ester monomers such as methyl (meth)acrylate, ethyl (meth)acrylate, n-propyl (meth)acrylate, n-butyl (meth)acrylate, isobutyl (meth)acrylate, t-butyl (meth)acrylate, n-pentyl (meth)acrylate, n-heptyl (meth) acrylate, 2-ethylhexyl (meth)acrylate, n-octyl (meth)acrylate, isooctyl (meth)acrylate, nonyl (meth)acrylate, isononyl (meth)acrylate, decyl (meth)acrylate, isodecyl (meth)acrylate, lauryl (meth)acrylate, tridecyl (meth)acrylate, and stearyl (meth)acrylate are preferable. Among them, n-butyl acrylate, n-octyl acrylate, 2-ethylhexyl acrylate, nonyl acrylate, isononyl acrylate, and isodecyl acrylate are more preferable. n-Butyl acrylate and n-octyl acrylate are particularly preferable.

For these components (C), one type may be used alone, and two or more types may be used in combination.

The content of the component (C) is preferably 0 to 75 parts by weight and more preferably 0 to 50 parts by weight with respect to 100 parts by weight of the component (A) from the viewpoint of further enhancing the effect of the present disclosure.

The glass transition temperature (Tg) of the component (C) is not particularly limited, but is preferably −40° C. or lower and more preferably −50° C. or lower. When the glass transition temperature (Tg) of the component (C) is higher than the above-mentioned temperature, the compression set and the like at low temperatures tend to deteriorate. Although the lower limit value is not particularly limited, it is −100° C., for example. For such a glass transition temperature (Tg) of the component (C), a homopolymer of the monofunctional (meth)acrylic monomer, which is the component (C), is measured with a differential scanning calorimeter (DSC) in the same manner as described above.

<Component (D)>

The polyfunctional (meth)acrylic monomer that is the component (D) is a (meth)acrylate compound having two or more (meth)acryloyl groups in the molecular structure. Specifically, there are known ethylenically unsaturated polyfunctional monomers, and examples of (meth)acrylic monomers having two or more (meth)acryloyl groups in the molecular structure include alkanediol di(meth)acrylates such as 1,6-hexanediol di(meth)acrylate, 1,8-octanediol di(meth)acrylate, 1,9-nonanediol di(meth)acrylate, 1,10-decanediol di(meth)acrylate, 1,12-dodecanediol di(meth)acrylate, 3-methyl-1,5-pentanediol di(meth)acrylate, 2,4-diethyl-1,5-pentanediol di(meth)acrylate, butyl ethyl propanediol di(meth)acrylate, 3-methyl-1,7-octanediol di(meth)acrylate, 2-methyl-1,8-octanediol di(meth)acrylate, and neopentyl glycol di(meth)acrylate, ethoxylated cyclohexanedimethanol di(meth)acrylate, ethoxylated bisphenol A di(meth)acrylate, tricyclodecanedimethanol di(meth)acrylate, propoxylated-ethoxylated bisphenol A di(meth)acrylate, and 1,1,1-trishydroxymethylethane di(meth)acrylate.

Examples of (meth)acrylic monomers having 3 or more (meth)acryloyl groups include pentaerythritol acrylate compounds, which have a pentaerythritol structure and a (meth) acrylate structure, such as trimethylolpropane tri(meth)acrylate, trimethylolpropane ethoxy tri(meth)acrylate, trimethylolpropane propoxy tri(meth)acrylate, glycerin propoxy tri(meth)acrylate, tetramethylolmethane tri(meth) acrylate, tetramethylolmethane tetra(meth)acrylate, ditrimethylolpropane tetra(meth) acrylate, monopentaerythritol (meth)acrylate, dipentaerythritol (meth)acrylate, tripentaerythritol (meth)acrylate, and polypentaerythritol (meth) acrylate.

Among these components (D), alkanediol di(meth)acrylates such as 1,6-hexanediol di(meth)acrylate, 1,8-octanediol di(meth)acrylate, 1,9-nonanediol di(meth)acrylate, 1,10-decanediol di(meth)acrylate, 1,12-dodecanediol di(meth)acrylate, 3-methyl-1,5-pentanediol di(meth)acrylate, 2,4- diethyl-1,5-pentanediol di(meth)acrylate, butyl ethyl propanediol di(meth)acrylate, 3-methyl-1,7-octanediol di(meth)acrylate, 2-methyl-1,8-octanediol di(meth)acrylate, and neopentyl glycol di(meth)acrylate; and pentaerythritol acrylate compounds are preferable from the viewpoint of further enhancing the effect of the present disclosure. Among them, 1,6-hexanediol di(meth)acrylate, 1,9-nonanediol di(meth)acrylate, and pentaerythritol acrylate compounds are more preferable.

The number of carbon atoms in the molecular chain (main chain) of the polyfunctional (meth)acrylic monomer that is the component (D) is preferably 6 or more. When the number of carbon atoms is less than the above-mentioned numerical value, a compression cracking property tends to deteriorate.

For these components (D), one type may be used alone, and two or more types may be used in combination. For example, a mixture of tripentaerythritol acrylate, dipentaerythritol acrylate, monopentaerythritol acrylate, and polypentaerythritol acrylate may be used as a pentaerythritol acrylate compound.

With respect to 100 parts by weight of the component (A), the content of the component (D) is 1 to 10 parts by weight, and is preferably 2 to 7.5 parts by weight from the viewpoint of further enhancing the effect of the present disclosure. That is, when the content of the above-mentioned component (D) is smaller than the above-mentioned range, the high temperature compression set and the like deteriorate, whereas when the content of the above-mentioned component (D) is larger than the above-mentioned range, compression resistance deteriorates.

<Component (E)>

The radical polymerization initiator that is the component (E) is not particularly limited as long as it is a compound that generates radicals upon irradiation with energy rays, and examples thereof include benzophenone-based compounds such as benzophenone, 4-methylbenzophenone, 2,4,6-trimethylbenzophenone, methylorthobenzoylbenzoate, and 4-phenylbenzophenone; anthraquinone-based compounds such as t-butylanthraquinone and 2-ethylanthraquinone; alkylphenone-based compounds such as 2-hydroxy-2-methyl-1-phenylpropan-1-one, oligo{2-hydroxy-2-methyl-1-[4-(1-methylvinyl)phenyl]propanone}, benzyl dimethyl ketal, 1-hydroxycyclohexyl phenyl ketone, benzoin methyl ether, 2-methyl-[4-(methylthio)phenyl]-2-morpholino-1-propanone, and 2-hydroxy-1-{4-[4-(2-hydroxy-2-methyl-propionyl)benzyl]phenyl}-2-methylpropan-1-one; thioxanthone-based compounds such as 2-benzyl-2-dimethylamino-1-(4-morpholinophenyl)-butanone-1, diethylthioxanthone, and isopropylthioxanthone; acylphosphine oxide-based compounds such as 2,4,6-trimethylbenzoyldiphenylphosphine oxide, bis(2,6-dimethoxybenzoyl)-2,4,4-trimethylpentylphosphine oxide, and bis(2,4,6-trimethylbenzoyl)-phenylphosphine oxide; and phenylglyoxylate-based compounds such as phenylglyoxylic acid methyl ester. Among them, from the viewpoint of excellent reactivity, alkylphenone-based compounds are preferable, and specifically, 1-hydroxycyclohexylphenyl ketone and the like are preferable.

For these components (E), one type may be used alone, and two or more types may be used in combination.

The content of the component (E) is 0.01 to 10 parts by weight and is preferably 0.1 to 10 parts by weight with respect to 100 parts by weight of the component (A).

<Various Additives>

In addition to the above-mentioned components (A) to (E), in the material of the seal member relating to the member for a fuel cell of the present disclosure, various additives such as the following filler (F), the following anti-aging agent (G), a compatibilization agent, a curable adjuster, a lubricant, a pigment, an anti-foaming agent, a foaming agent, a light stabilizer, and a surface modifier may be blended as long as the effect of the present disclosure is not impaired.

<Component (F)>

The filler that is the component (F) is not particularly limited, but examples thereof includes silica, carbon black, calcium carbonate, titanium oxide, talc, clay, and glass balloons, among which silica is preferable because of its excellent reinforcing properties. From the viewpoint of improving dispersibility, silica hydrophobized with a surface treatment agent is more preferable. As the silica hydrophobized with a surface treatment agent, for example, silica surface-treated with a silane compound is preferable, and silica dimethyl silylate surface-treated with dimethylsilane, silica trimethyl silylate surface-treated with trimethylsilane, silica octyl silylate surface-treated with octylsilane, and silica methacryl silylate surface-treated with methacryloxysilane are more preferable, among which silica trimethyl silylate and silica methacryl silylate are particularly preferable.

Examples of commercially available products of the component (F) include "AEROSIL RX200" (manufactured by AEROSIL) which is silica trimethyl silylate, and "AEROSIL R7200" (manufactured by AEROSIL) which is silica methacryl silylate.

For these components (F), one type may be used alone, and two or more types may be used in combination.

When the component (F) is contained, the content thereof is not particularly limited, but is usually 1 to 30 parts by weight with respect to 100 parts by weight of the component (A). When the content of the component (F) is larger the above-mentioned range, handleability tends to deteriorate due to a high viscosity exhibited.

<Component (G)>

The anti-aging agent that is the component (G) is not particularly limited, but examples thereof include amine-based anti-aging agents such as N-phenyl-1-naphthylamine, N,N'-diphenyl-p-phenylenediamine, N,N'-di-2-naphthyl-p-phenylenediamine, N-phenyl-N'-isopropyl-p-phenylenediamine, di(4-octylphenyl)amine, 4,4'-bis(α,α-dimethylbenzyl)diphenylamine, p-(p-toluenesulfonylamido) diphenylamine, and N-phenyl-N'-(1,3-dimethylbutyl)-p-phenylenediamine; phenol-based anti-aging agents such as 2,6-di-t-butyl-4-methylphenol, 2,6-di-t-butyl-4-ethylphenol, 2,6-di-t-butylphenol, 2,4,6-tri-t-butylphenol, styrenated phenol, 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), 4,4'-methylenebis(2,6-t-butylphenol), 4,4'-isopropylidenebis(2,6-di-t-butylphenol), and 2,2'-isobutylidenebis(4,6-dimethylphenol); imidazole-based anti-aging agents such as 2-mercaptobenzimidazole, 2-mercaptobenzimidazole zinc salts, and 2-mercaptomethylbenzimidazole; and sulfur-based anti-aging agents such as dilauryl thiodipropionate and distearyl thiodipropionate. Among them, amine-based anti-aging agents and phenol-based anti-aging agents are preferable, among which 4,4'-bis(α,α-dimethylbenzyl)diphenylamine is preferable.

For these components (G), one type may be used alone, and two or more types may be used in combination.

When the component (G) is contained, the content thereof is not particularly limited, but it is usually 0.1 to 10 parts by weight and is preferably 0.5 to 5 parts by weight with respect to 100 parts by weight of the component (A).

<Method for Preparing Radically Curable Composition>

The radically curable composition used as the material for the seal member of the member for a fuel cell of the present disclosure is prepared by adding the component (A) to a mixture, in which the components (B) to (E), and if necessary, various additives such as the components (F) and (G) have been blended and stirred for example, and mixing using a mixer. Furthermore, when silica or the like is blended in as the component (F), production is performed by adding the component (A) in which the component (F) has been dispersed to a mixture in which the components (B) to (E), various additives, and the like have been blended and stirred for example, and mixing using a mixer.

<Method for Manufacturing Member for Fuel Cell>

The member for a fuel cell of the present disclosure can be manufactured by applying the radically curable composition prepared as described above to the surface of the base material for a fuel cell, and cross-linking the radically curable composition by irradiating the portion subjected to the application with active energy rays to form a seal member. A method for applying the above-mentioned radically curable composition is not particularly limited, but various methods such as dispenser, spray, ink jet, and screen printing can be used, for example. More specifically, sealing methods such as form-in-place gasket (FIPG), cure-in-place gasket (CIPG), and mold-in-place gasket (MIPG) can be used. As the above-mentioned active energy rays, electron beams, ultraviolet rays, and the like are radiated, among which ultraviolet rays are more preferable because they cause little damage to the base material for a fuel cell. As an active energy source for the active energy rays, a known one can be used, and a high-pressure mercury lamp, a black light, an LED, a fluorescent lamp, and the like can be used, for example. The above-mentioned radically curable composition is cross-linked by active energy rays such as electron beams and ultraviolet rays, but may be cross-linked by supplementarily performing heating if necessary.

The glass transition temperature (Tg) of the cross-linked body (seal member) of the above-mentioned radically curable composition is −30° C. or lower. The above-mentioned glass transition temperature (Tg) is more preferably −35° C. or lower from the viewpoint of further enhancing the effect of the present disclosure. Although the lower limit value of the glass transition temperature (Tg) is not particularly limited, it is −100° C., for example. Such a glass transition temperature (Tg) is measured with a differential scanning calorimeter (DSC) in the manner described above.

FIG. 1 shows an example (cross-sectional view) of the member for a fuel cell of the present disclosure. In FIG. 1, a cross-sectionally protruded and recessed separator 5 in which a total of six rectangular thin plate-shaped grooves extending in the longitudinal direction is provided as recesses is used as the base material for a fuel cell. In addition, a rectangular and cross-sectionally protruded lip **4*b* (seal member) can be formed in a state of being firmly and directly fixed (adhered without using an adhesive) to the surface (peripheral portion) of the separator 5 by applying the radically curable composition prepared as described above to the peripheral portion of the separator 5**, and cross-linking the radically curable composition by irradiating the portion subjected to the application with active energy rays.

Although the above-mentioned base material for a fuel cell varies depending on the type and structure of a fuel cell, examples thereof include gas diffusion layers and MEAs (electrolyte membrane and electrodes), in addition to the above-mentioned separators (metal separators, carbon separators, and the like).

In addition, the cross-linked body (seal member) of the above-mentioned radically curable composition can be easily formed into a membrane-like seal member, and by forming the seal member into a thin membrane, miniaturization of a fuel cell can be realized. Specifically, for easy formation into a thin membrane, the thickness of the membrane-like seal member is 50 to 1,000 μm (preferably 75 to 900 μm, and more preferably 100 to 800 μm), which makes it possible to realize the miniaturization of a fuel cell. Furthermore, for the above-mentioned seal member, excellent sealability can be realized by satisfying having properties such as settling resistance, stretchability, and compression resistance over a wide temperature range.

<Fuel Cell>

Figure 2:
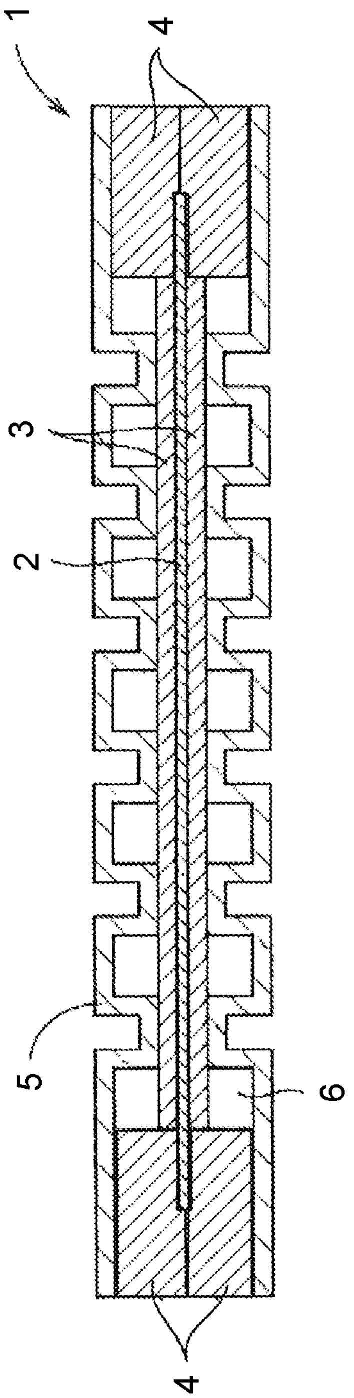
FIG. 2 is a cross-sectional view showing an example in which the member for a fuel cell of the present disclosure was used.

In addition, the member for a fuel cell obtained as described above can be used to manufacture a fuel cell. FIG. 2 mainly shows a single cell 1 in a fuel cell in which a plurality of cells are stacked, and the cell 1 includes an MEA 2, a gas diffusion layer 3, a seal member 4, and a separator 5. In addition, the seal member 4 seals between the separator 5 constituting the cell 1 and the end part of the MEA 2.

The above-mentioned seal member 4 is manufactured integrally with the separator 5 and the MEA 2 by the manufacturing method described above. In addition, since the seal member 4 has excellent pressure-sensitive adhesiveness, the two seal members 4 as shown in FIG. 2 are adhered without an adhesive layer, which makes it possible to integrally manufacture the cell 1. Since it is not required to separately provide an adhesive layer as described above, this can contribute to the simplification of the manufacturing process of a fuel cell. In the example of FIG. 2, two members divided into upper and lower parts are used as the seal members 4, but a single seal member in which these two members are combined may also be used.

Although not shown, the MEA 2 includes an electrolyte membrane, and a pair of electrodes disposed on both sides in the stacking direction with the electrolyte membrane therebetween. The electrolyte membrane and the pair of electrodes are rectangular thin plates. The gas diffusion layers 3 are disposed on both sides in the stacking direction with the MEA 2 therebetween. The gas diffusion layer 3 is a porous layer and has a rectangular thin plate shape.

The separator 5 is preferably a carbon separator or made of metal, and from the viewpoint of conduction reliability, a metal separator having a carbon thin membrane such as a diamond-like carbon membrane (DLC membrane) and a graphite membrane is particularly preferable. In the separator 5, a total of six rectangular thin plate-shaped grooves extending in the longitudinal direction are provided as recesses, and due to these grooves, the cross-section of the separator 5 has a protruded and recessed shape. The separators 5 are disposed on both sides of the gas diffusion layer 3 in the stacking direction so as to face each other. Between the gas diffusion layer 3 and the separator 5, gas flow paths 6 for supplying gas to the electrodes are comparted by utilizing the protruded and recessed shape.

At the time of operation of a fuel cell such as a polymer electrolyte fuel cell, fuel gas and oxidant gas are each supplied through the gas flow paths 6. Herein, the peripheral portion of the MEA 2 is sealed with the seal member 4. Therefore, no gas mixture or leakage occurs.

EXAMPLES

Examples will be described below together with comparative examples. However, the present disclosure is not limited to these examples as long as the gist thereof is not exceeded.

First, the materials shown below were prepared prior to examples and comparative examples.

<Component (A)>

Acryloyl Group-Terminated Polyacrylate A1 (Synthesis Example)

According to a known method (disclosed in Japanese Patent Laid-Open No. 2012-211216, for example), cuprous bromide was used as a catalyst, pentamethyldiethylenetriamine was used as a ligand, and diethyl-2,5-dibromoadipate was used as a radical polymerization initiator. Using 50 parts by weight/50 parts by weight of 2-ethylhexyl acrylate/n-butyl acrylate as acrylic monomers, polymerization was caused at an acrylic monomers/radical polymerization initiator ratio (molar ratio) of 180 to obtain a bromine group-terminated 2-ethylhexyl acrylate/n-butyl acrylate copolymer. This copolymer was dissolved in N,N-dimethylacetamide, potassium acrylate was added, and the mixture was heated and stirred at 70° C. in a nitrogen atmosphere. After the N,N-dimethylacetamide in this mixed solution was distilled off under reduced pressure, butyl acetate was added to the residue, and the insoluble fraction was removed by filtration. The butyl acetate in the filtrate was distilled off under reduced pressure to obtain a 2-ethylhexyl acrylate/n-butyl acrylate copolymer [A1] having an acryloyl group at the end. The number average molecular weight was 23,000, the molecular weight distribution was 1.1, and the average number of acryloyl groups introduced per polymer molecule was about 1.9 as obtained by $1^{H}$-NMR analysis. In addition, the glass transition temperature (Tg) was −50° C.

<Component (B)>

Dicyclopentenyloxyethyl acrylate (Tg: 10° C. to 15° C., manufactured by Hitachi Chemical Co., Ltd.), and isobornyl acrylate (Tg: 97° C., manufactured by Hitachi Chemical Co., Ltd.)

<Component (C)> n-Octyl acrylate (Tg: −65° C., manufactured by OSAKA ORGANIC CHEMICAL INDUSTRY LTD.)

<Component (D)>

1,9-Nonanediol diacrylate (manufactured by OSAKA ORGANIC CHEMICAL INDUSTRY LTD.)

<Component (E)>

1-Hydroxycyclohexyl phenyl ketone (manufactured by iGM Resins, Omnirad 184)

Examples 1 to 8 and Comparative Examples 1 to 6

Radically curable compositions were prepared by blending the components shown in Tables 1 and 2 below in the proportions shown in the same tables, and kneading with a planetary mixer (manufactured by INOUE MFG., INC.).

The glass transition temperature (Tg) of a sample cross-linked by irradiating (irradiation intensity: 250 mW/$cm^2$, integrated light amount: 3,000 mJ/$cm^2$) each radically curable composition obtained above with ultraviolet rays using a high-pressure mercury UV irradiator (manufactured by Heraeus, F600V-10) was measured with a differential scanning calorimeter (DSC). The results are shown in Tables 1 and 2.

Then, each property of each of the radically curable compositions obtained as described above was evaluated according to the following criteria. The results are shown in Tables 1 and 2.

<<Pressure-Sensitive Adhesiveness>>

Each of the radically curable compositions was irradiated (irradiation intensity: 250 mW/$cm^2$, integrated light amount: 3,000 mJ/$cm^2$) with ultraviolet rays using a high-pressure mercury UV irradiator (manufactured by Heraeus, F600V-10) to obtain a test sample having a thickness of 1 mm. Then, using a fixing simulator FSR-1000 manufactured by RHESCA Co., LTD., at room temperature (25° C.), a gauge head made of SUS304 was pressed into the above-mentioned test sample at a compressive force of 0.8 MPa and a rate of 0.5 mm/seconds, and thereafter was pulled up at a rate of 15 mm/seconds after being held for 10 seconds to measure a peel force, and the pressure-sensitive adhesiveness was evaluated according to the following criteria.

◎: a peel force of 1.0 MPa or more (excellent)

O: a peel force equal to or more than 0.9 MPa and less than 1.0 MPa (very good)

Δ: a peel force equal to or more than 0.8 MPa and less than 0.9 MPa (good)

X: a peel force less than 0.8 MPa (poor)

<<Low Temperature Compression Set>>

A test sample having a diameter of 15 mm and a thickness of 1 mm was obtained using each of the radically curable compositions under the conditions same as the production conditions for the test sample produced in the above-mentioned pressure-sensitive adhesiveness test. Then, a compression set test at a low temperature was performed on the above-mentioned test sample in accordance with JIS K 6262. That is, each sample was compressed at a compression ratio of 25%, stored in this state at −30° C. for 24 hours, and thereafter released from compression in a −30° C. environment. After a lapse of 30 minutes in the above-mentioned environment, the thickness of each sample was measured to calculate the compression set (%), which was then evaluated according to the following criteria.

◎: less than 30% (excellent)

O: equal to or more than 30% and less than 40% (very good)

Δ: equal to or more than 40% and less than 50% (good)

X: 50% or more (poor)

<<Low Temperature Compression Cracking>>

The compression ratio was changed to 50% in the above-mentioned low temperature compression set test. Other than that, the test was conducted under the same conditions as the above-mentioned test to visually confirm the presence or absence of cracks in each sample.

O: No cracks (good)

X: Cracked (poor)

<<High Temperature Compression Set>>

A test sample having a diameter of 15 mm and a thickness of 1 mm was obtained using each of the radically curable compositions under the conditions same as the production conditions for the test sample produced in the above-mentioned pressure-sensitive adhesiveness test. Then, a compression set test at a high temperature was performed on the above-mentioned test sample in accordance with JIS K 6262. That is, each sample was compressed at a compression ratio of 25%, heated in this state at 120° C. for 24 hours, and thereafter released from compression. After a lapse of 30 minutes at room temperature (25° C.), the thickness of each sample was measured to calculate the compression set (%), which was then evaluated according to the following criteria.

◎: less than 20% (excellent)

O: equal to or more than 20% and less than 25% (very good)

Δ: equal to or more than 25% and less than 30% (good)

X: 30% or more (poor)

<<High Temperature Compression Cracking>>

The compression ratio was changed to 50% in the above-mentioned high temperature compression set test. Other than that, the test was conducted under the same conditions as the above-mentioned test to visually confirm the presence or absence of cracks in each sample.

O: No cracks (good)

X: Cracked (poor)

adhesiveness (adhesiveness) evaluation because the component (B) of the present disclosure was not contained. In Comparative Examples 2 and 4, the value of [(B)/{(A)+(B)+(C)}] was smaller than the range specified in the present disclosure, resulting in poor evaluation of the pressure-sensitive adhesiveness (adhesiveness), and in Comparative Example 3, the value of [(B)/{(A)+(B)+(C)}] was larger than the range specified in the present disclosure, resulting in poor evaluation of the compression set and the like. In Comparative Example 5, the content of the component (D) of the present disclosure was smaller than the range specified in the present disclosure, resulting in poor evaluation of the high temperature compression set, and in Comparative

TABLE 1

(parts by weight)

| | | Example | | | | | | | |
|---|---|---|---|---|---|---|---|---|---|
| | | 1 | 2 | 3 | 4 | 5 | 6 | 7 | 8 |
| A | Acryloyl group-terminated polyacrylate A1 | 100 | 100 | 100 | 100 | 100 | 100 | 100 | 100 |
| B | Dicyclopentenyloxyethyl acrylate | 15 | — | 8 | 30 | 15 | 40 | 15 | 15 |
| | Isobornyl acrylate | — | 15 | — | — | — | — | — | — |
| C | n-Octyl acrylate | — | — | — | — | 15 | 60 | — | — |
| D | 1,9-Nonanediol diacrylate | 5 | 5 | 5 | 5 | 5 | 5 | 1 | 10 |
| E | 1-Hydroxycyclohexyl phenyl ketone | 5 | 5 | 5 | 5 | 5 | 10 | 0.1 | 0.1 |
| | (B)/{(A) + (B) + (C)} Weight ratio | 13% | 13% | 7% | 23% | 12% | 20% | 13% | 13% |
| | Glass transition temperature (Tg) | −38° C. | −40° C. | −41° C. | −34° C. | −39° C. | −36° C. | −38° C. | −37° C. |
| | Pressure-sensitive adhesiveness | ○ | ○ | ○ | ◎ | ○ | ◎ | ○ | ○ |
| | Low temperature compression set | ○ | ◎ | ◎ | Δ | ○ | ○ | ○ | ○ |
| | Low temperature compression cracking | ○ | ○ | ○ | ○ | ○ | ○ | ○ | ○ |
| | High temperature compression set | ○ | ○ | ◎ | Δ | ○ | Δ | ○ | ◎ |
| | High temperature compression cracking | ○ | ○ | ○ | ○ | ○ | ○ | ○ | ○ |

TABLE 2

(parts by weight)

| | | Comparative Example | | | | | |
|---|---|---|---|---|---|---|---|
| | | 1 | 2 | 3 | 4 | 5 | 6 |
| A | Acryloyl group-terminated polyacrylate A1 | 100 | 100 | 100 | 100 | 100 | 100 |
| B | Dicyclopentenyloxyethyl acrylate | — | 5 | 40 | 8 | 15 | 15 |
| | Isobornyl acrylate | — | — | — | — | — | — |
| C | n-Octyl acrylate | 15 | — | — | 60 | — | — |
| D | 1,9-Nonanediol diacrylate | 5 | 5 | 5 | 5 | 0.5 | 15 |
| E | l-Hydroxycyclohexyl phenyl ketone | 5 | 5 | 5 | 5 | 5 | 5 |
| | (B)/{(A) + (B) + (C)} Weight ratio | 0% | 4.8% | 29% | 4.8% | 13% | 13% |
| | Glass transition temperature (Tg) | −48° C. | −43° C. | −28° C. | −43° C. | −38° C. | −37° C. |
| | Pressure-sensitive adhesiveness | X | X | ◎ | X | ○ | ○ |
| | Low temperature compression set | ◎ | ◎ | X | ◎ | ○ | ○ |
| | Low temperature compression cracking | ○ | ○ | X | ○ | ○ | X |
| | High temperature compression set | ○ | ○ | X | ○ | X | ○ |
| | High temperature compression cracking | ○ | ○ | ○ | ○ | ○ | X |

From the results in Table 1 above, it was found that, for Examples 1 to 8 in which each of the requirements specified in the present disclosure was satisfied, the following results were obtained: the evaluation of the pressure-sensitive adhesiveness (adhesiveness), and the compression set and the compression cracking (compression resistance) at a low temperature were excellent; and each evaluation of the compression set and the compression cracking at a high temperature was also favorable. Therefore, these can exhibit excellent performance as seal materials for the member for a fuel cell.

On the other hand, from the results in Table 2 above, Comparative Example 1 resulted in poor pressure-sensitive Example 6, the content of the component (D) of the present disclosure was larger than the range specified in the present disclosure, resulting in the generation of compression cracking at low and high temperatures. Therefore, in these comparative examples, performance as a seal material for the member for a fuel cell could not be exhibited as in the above-mentioned examples.

Although the specific embodiments of the present disclosure have been described in the above-mentioned examples, the above-mentioned examples are merely examples and are not to be construed in a limited manner. Various modifications apparent to a person skilled in the art are intended to be within the scope of the present disclosure.

INDUSTRIAL APPLICABILITY

The member for a fuel cell of the present disclosure is used as a member constituting a fuel cell, and is a member in which a base material for a fuel cell such as a metal separator, and a seal member made of rubber for sealing it are integrated without using an adhesive. Therefore, the member can be utilized as a seal body and the like for which there is a concern about the use of adhesives.

The invention claimed is:

1. A member for a fuel cell comprising:

a base material for a fuel cell; and a seal member that is directly fixed to a surface of the base material for a fuel cell, wherein the seal member is a cross-linked body of a radically curable composition which contains the following component (D) at a proportion of 1 to 10 parts by weight and the following component (E) at a proportion of 0.01 to 10 parts by weight with respect to 100 parts by weight of the following component (A) and in which a content of the following component (B) with respect to a total weight of the following components (A) to (C) is 5% to 25% by weight, and a glass transition temperature Tg of the cross-linked body is −30° C. or lower, (A) a (meth)acrylic polymer having a (meth)acryloyl group at a molecular chain end, (B) a monofunctional (meth)acrylic monomer having a glass transition temperature Tg of 0° C. or higher and having a polycyclic structure, (C) a monofunctional (meth)acrylic monomer excluding the component (B), (D) a polyfunctional (meth)acrylic monomer, and (E) a radical polymerization initiator.

2. The member for a fuel cell according to claim 1, wherein the polycyclic structure of the component (B) comprises a polycyclic structure having 10 or more carbon atoms.

3. The member for a fuel cell according to claim 1, wherein a content of the component (C) in the radically curable composition is in a range of 0 to 75 parts by weight with respect to 100 parts by weight of the component (A).

4. The member for a fuel cell according to claim 1, wherein the component (D) is at least one selected from the group consisting of 1,6-hexanediol di(meth)acrylate, 1,9-nonanediol di(meth)acrylate, and pentaerythritol acrylate compounds.

5. The member for a fuel cell according to claim 1, wherein the radically curable composition further contains silica.

6. The member for a fuel cell according to claim 5, wherein the silica is at least one selected from the group consisting of silica dimethyl silylate, silica trimethyl silylate, silica octyl silylate, and silica methacryl silylate.

7. The member for a fuel cell according to claim 1, wherein the radically curable composition is an ultraviolet curable composition.

8. The member for a fuel cell according to claim 1, wherein the seal member is a membrane-like seal member.

9. The member for a fuel cell according to claim 8, wherein a thickness of the membrane-like seal member is 50 to 1,000 μm.

* * * * *